US007734688B2

(12) United States Patent
Langdon

(10) Patent No.: US 7,734,688 B2
(45) Date of Patent: Jun. 8, 2010

(54) PORTABLE WIRELESS PLAYER AND ASSOCIATED METHOD

(75) Inventor: Warren E. Langdon, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 683 days.

(21) Appl. No.: 11/270,024

(22) Filed: Nov. 9, 2005

(65) Prior Publication Data
US 2006/0069724 A1 Mar. 30, 2006

Related U.S. Application Data

(63) Continuation of application No. 09/672,398, filed on Sep. 28, 2000, now abandoned.

(51) Int. Cl.
*G06F 15/16* (2006.01)
(52) U.S. Cl. ............... 709/203; 709/219; 709/232; 370/310
(58) Field of Classification Search ............... 709/200, 709/203, 217–219, 231, 232; 370/310
See application file for complete search history.

(56) References Cited

U.S. PATENT DOCUMENTS

| 5,619,425 A | 4/1997 | Funahashi et al. |
| 5,787,080 A * | 7/1998 | Hulyalkar et al. ........ 370/310.2 |
| 5,819,160 A | 10/1998 | Foladare et al. |
| 5,841,979 A | 11/1998 | Schulhof et al. |
| 6,055,566 A | 4/2000 | Kikinis |
| 6,236,832 B1 | 5/2001 | Ito |
| 6,389,467 B1 * | 5/2002 | Eyal ........................... 709/223 |
| 6,425,018 B1 | 7/2002 | Kaganas et al. |
| 6,434,134 B1 * | 8/2002 | La Porta et al. ............. 370/338 |
| 6,446,080 B1 | 9/2002 | Van Ryzin et al. |
| 6,480,961 B2 | 11/2002 | Rajasekharan et al. |
| 6,496,802 B1 | 12/2002 | van Zoest et al. |
| 6,502,194 B1 * | 12/2002 | Berman et al. ................ 726/28 |
| 6,510,210 B1 | 1/2003 | Baughan |
| 6,546,421 B1 | 4/2003 | Wynblatt et al. |

OTHER PUBLICATIONS

Time Magazine: "Wireless Summer", by Adam Cohen (May 29, 2000).
Inouye et al., "System support for mobile multimedia applications", IEEE, NOSSDAV'97, May 19-21, 1997, pp. 143-154.
Cataldo, Anthony, "Japan allies to use SD card for wireless music network", Electronic Engineering Times, Issue 1098, p. 24, Jan. 1, 2000.
Computer Dealer News "New products/Systems: Yepp its an MP3 music player" Computer Dealer News, Mar. 31, 2000, vol. 15 Issue 7, p. 42.

* cited by examiner

*Primary Examiner*—David Lazaro

(57) ABSTRACT

A method of providing programming to a portable wireless music player includes connecting to a music service provider from a remote client and defining a play list at the music service provider through user interaction at the remote client. The player connects to the music service provider over a wireless service network and downloads music to the player from the music service provider in accordance with the previously defined play list. The music or other programming is played at the player.

22 Claims, 2 Drawing Sheets

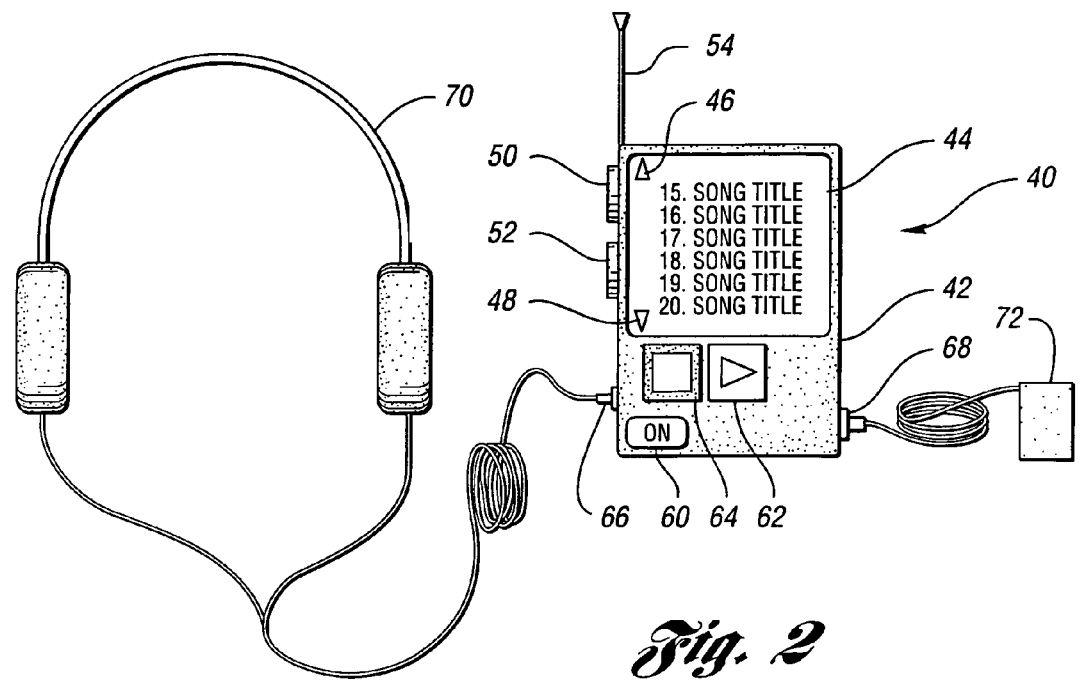
*Fig. 2*
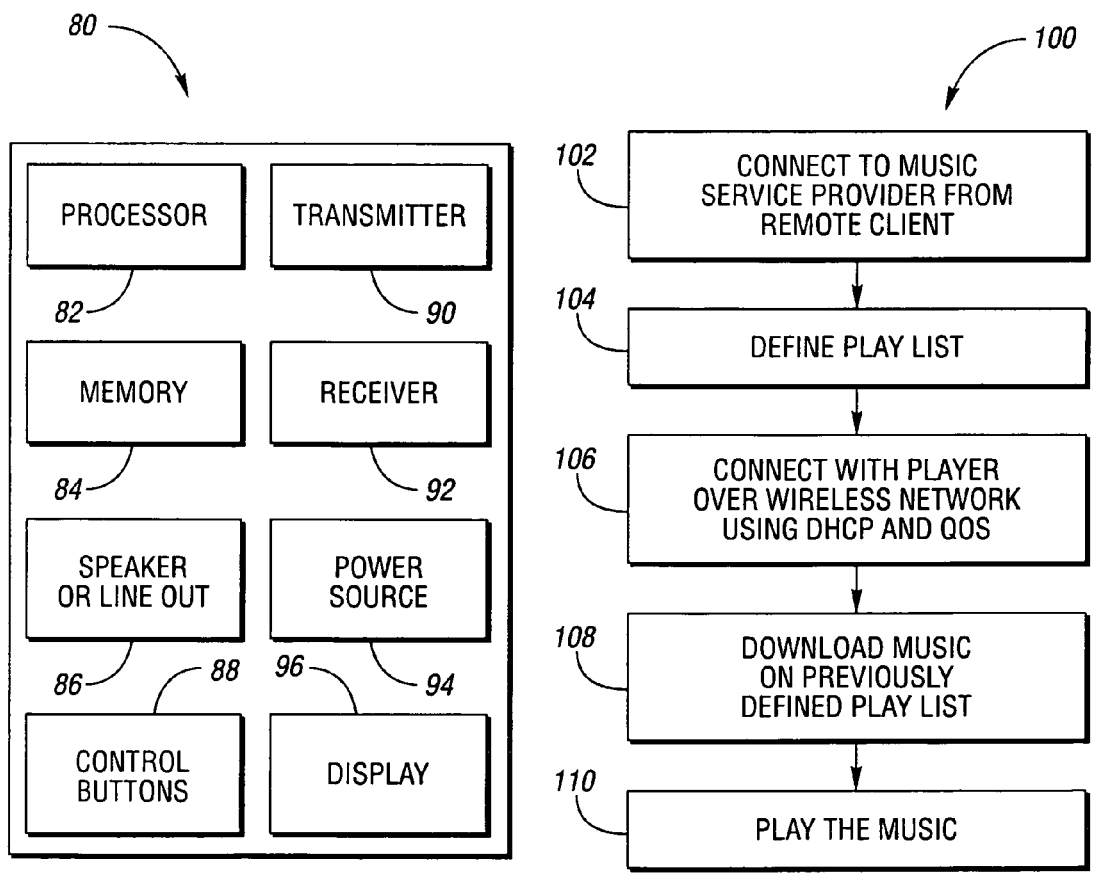
*Fig. 3*
*Fig. 4*

PORTABLE WIRELESS PLAYER AND ASSOCIATED METHOD

CROSS-REFERENCE TO RELATED APPLICATIONS

This application is a continuation of U.S. application Ser. No. 09/672,398 filed Sep. 28, 2000 now abandoned.

TECHNICAL FIELD

The present invention relates to a method of providing programming to a portable wireless player.

BACKGROUND ART

The use of wireless technology has become widespread. Some existing cellular phones include a plethora of features, with some of these phones having microbrowsers and messaging capabilities. Today's cellular phone is not just an ordinary phone anymore, but is packed with features. Similarly, sophisticated wireless personal digital assistants are also available. In addition to traditional calendar and planning software, these personal digital assistants include wireless capabilities to allow messaging, such as e-mail, as well as a form of limited web access.

Although many existing wireless devices including cellular phones and personal digital assistants have been commercially successful, many of these devices have many advanced features and the consumer is forced to pay a premium for the product even though many of the features may go unused. Because the wireless revolution is in its infancy, there is a need for improved wireless products. In addition, there is a need for a wireless device that provides the functionality demanded by a consumer while providing enough simplicity to keep the product cost low.

DISCLOSURE OF INVENTION

It is, therefore, an object of the present invention to provide a method of providing programming to a portable wireless player.

In carrying out the above object and other objects and features of the present invention, a method of providing programming to a portable wireless music player having a memory is provided. The player is operative to transmit and receive information over a wireless link to a wireless service network. The wireless service network is in communication with a music service provider, wherein the music service provider allows connections for remote clients. The method comprises connecting to the music service provider from a remote client, defining a play list at the music service provider through user interaction at the remote client, and connecting to the music service provider with the player over the wireless service network. The method further comprises downloading music to the player from the music service provider in accordance with the previously defined play list, and playing the music at the player.

In one particular implementation, the music service provider is connected to the Internet. The music service provider is connected to the remote client over the Internet. It is appreciated that a computer or similar device is used by the end user to predefine a play list at the music service provider. Thereafter, a portable wireless music player may download and play the music. The player is suitably made with sufficient functionality to select and play items off the predefined play list, but is kept sufficiently simple to keep costs of production low. Because the content for playing is downloaded by the device, the device may have less memory than similar devices in which all content must be stored in the memory of the device (that is, devices that cannot communicate with the wireless network such as existing portable MP3 players).

The wireless service network may include a packet network such as a virtual local area network. In accordance with a preferred embodiment of the present invention, the wireless service network includes a last leg in accordance with Internet protocol (IP). More preferably, the last leg is in accordance with dynamic host configuration protocol (DHCP). Most preferably, the connection between the music service provider, including a portion of the connection over the last leg, includes a quality of service rating. In this way, the same network may be utilized for the portable wireless player that is utilized for other devices, such as the cellular phone by giving the other devices a higher quality of service rating so that the portable wireless music player does not noticeably interfere with the other devices.

Further, in carrying out the present invention, a method of providing programming to a portable wireless player having a memory is provided. The player is operative to transmit and receive information over a wireless link to a wireless service network. The wireless service network is in communication with a service provider. The service provider allows connections from remote clients. The method comprises connecting to the service provider from a remote client, and defining a play list at the service provider through user interaction at the remote client. The method further comprises connecting to the service provider with the player over the wireless service network. The connection between the service provider and the player includes a quality of service rating wherein the wireless service network provides a plurality of services in addition to connections to the service provider. The plurality of services have different quality of service ratings. Further, programming is downloaded to the player from the service provider in accordance with the previously defined play list, and the programming is played at the player.

Still further, in carrying out the present invention, a portable wireless player for use in playing programming received over a wireless link to a wireless service network is provided. The wireless service network is in communication with a service provider that allows connections from a remote client. A remote client connects to the service provider and defines a play list at the service provider through user interaction at the remote client. The portable wireless player comprises a housing, a processor disposed in the housing, a memory disposed in the housing, a transmitter for transmitting information over the wireless service network, and a receiver for receiving information over the wireless service network. The portable wireless player further comprises instructions in the memory that direct the processor to connect the service provider over the wireless service network, to download programming to the player in accordance with the previously defined play list, and to play the programming.

Still further, in carrying out the present invention, a portable wireless music player for use in playing music received over a wireless link to a wireless service network is provided. The wireless service network is in communication with the music service provider that allows connections from remote clients. A remote client connects to the music service provider and defines a play list at the music service provider through user interaction at the remote client. The portable wireless player comprises a housing, a processor disposed in the housing, a memory disposed in the housing, a transmitter for transmitting information over the wireless service network, and a receiver for receiving information over the wireless service network. The player further comprises instructions in the memory, a display for displaying the play list, and a plurality of control buttons for selecting music to play from the play list on the display. The instructions in the memory direct the processor to connect to the music service provider over the wireless service network, to download music to the player in accordance with the previously defined play list, and to play the music.

The advantages associated with embodiments of the present invention are numerous. For example, methods and portable wireless players of the present invention provide a portable listening device that can retrieve and store and play, for example, MP3 (MPEG, Layer 3) user formats that are currently available on the Internet via a transmission control protocol/Internet protocol (TCP/IP) wireless data network. Some of the players may also be provided with paging and voice messaging receiving capabilities. A preferred portable listening device has the ability to download files while playing current files for listening. The device communicates, in a suitable implementation, as a TCP/IP client in a wireless/land line data network to a TCP/IP server, and the client device may support dynamic host configuration protocol (DHCP) to resolve static Internet protocol (IP) addressing issues. Providing a portable player with the ability to download from a predefined play list reduces the cost of buying flash memory which is used to store music and voice on current MP3 portable players because less memory is needed. Compulsive portable access to listening material becomes available to the consumer. Being only a listing device that is not time critical, constant bandwidth allocation that is a concern in a voice network is not a concern for the portable wireless player. There is no need for an expensive personal computer, personal digital assistant or cellular phone, but instead, a portable listing device with the present invention may be utilized. Embodiments of the present invention could bring back the days of the single hit phenomena that were at the beginning of rock and roll with the introduction of the 45 rpm records, providing more opportunities for a wider range of artists and e-commerce. Optionally, the devices could also receive short messages and access voice mail.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is an enlarged view of a suitable implementation of the portable wireless player;

FIG. 3 is a block diagram illustrating the portable wireless player; and

FIG. 4 is a block diagram illustrating a method of the present invention.

BEST MODE FOR CARRYING OUT THE INVENTION

Figure 1:
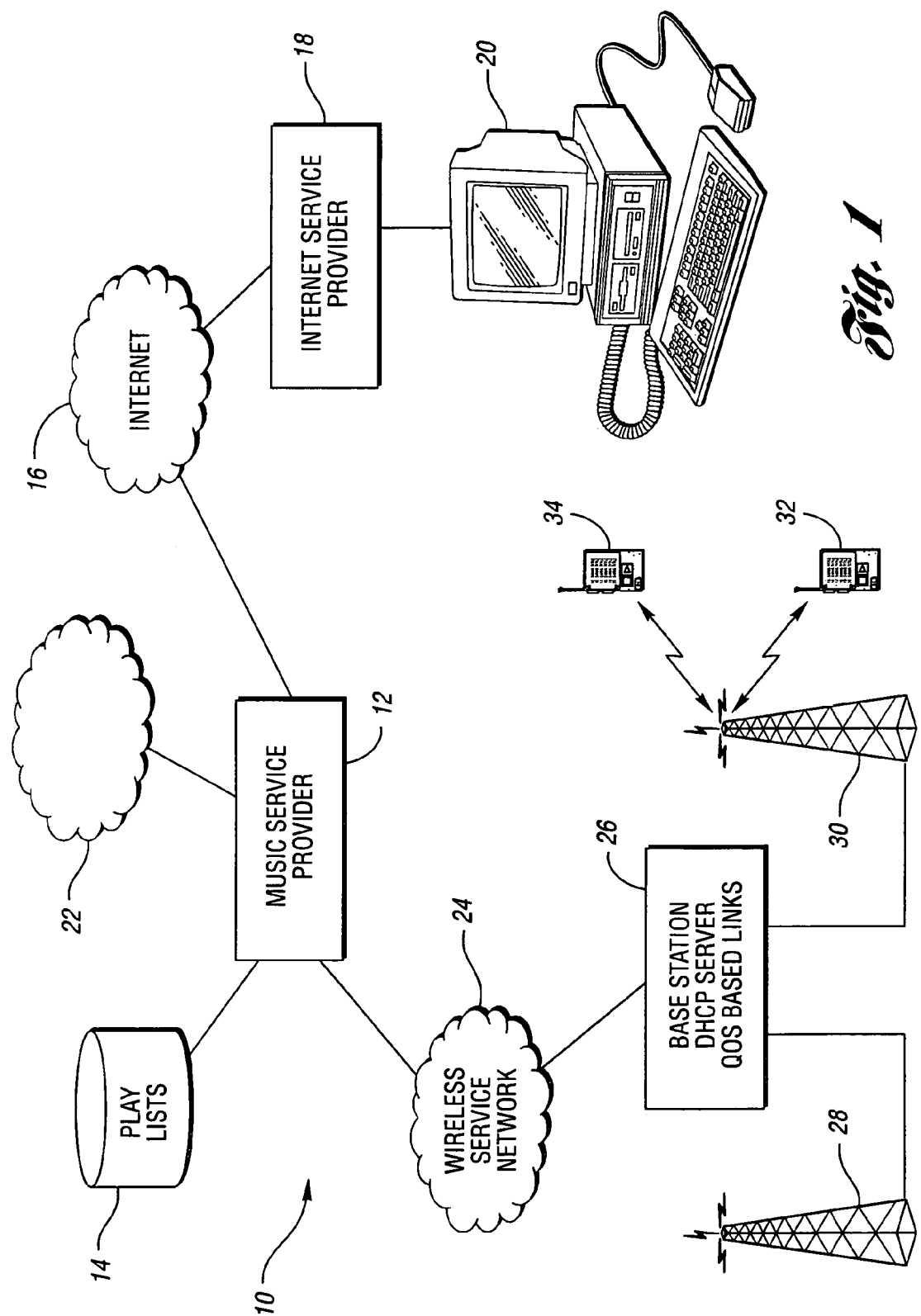
FIG. 1 is a network diagram illustrating the communications with the music service provider and with the portable wireless player.

Referring to FIG. 1, the overall networking environment for embodiments of the present invention is generally indicated at 10. A music service provider 12 is connected to a data base 14 storing the play lists for the various users of the portable wireless music players. It is appreciated that the play list includes information as defined by the particular user so that the wireless device may be a simple device with limited functionality, and have a reduced cost. That is, it is desirable to keep the cost of the wireless device very low so that the devices are almost "throw-away" devices, similar to existing portable radio devices that have become extremely low cost in recent years. This is advantageous over existing and quite expensive, portable MP3 players. To define the information in the play list, for a particular user, the user connects to the music service provider 12 from a remote client. It is appreciated that the user may connect to the music service provider 12 in a number of ways, with one of these ways being by connecting over the Internet 16. As shown, a user connects from a computer 20 through an Internet service provider 18, over the Internet 16, to music service provider 12. Of course, alternatively, the user may access music service provider 12 in a different manner or over a different network 22. The user, from computer 20, defines the play list at music service provider 12 through user interaction at the remote client computer 20. Thereafter, the particular user has a predefined play list stored in database 14 of music service provider 12. Thereafter, the portable wireless music player receives the predefined information from the play list and plays that information to the user. Preferably, embodiments of the present invention are implemented as music players such as an MP3 (MPEG, Layer 3) player. Of course, in the alternative, the predefined information in the play list may include additional information besides MP3 music tracks, such as preselected news channels, or even any other types of audio channels. Although best suited for music, the true advantage of the present invention is in that the portable wireless device may be implemented in a low-cost manner with limited functionality because the information in a play list is predefined by the user during access from a remote client that is different than the portable player, for example, a remote client computer connecting over the Internet.

Once the play list has been defined, the portable wireless player may connect to the music service provider to receive information over wireless service network 24. In a suitable implementation, wireless service network 24 includes a number of base stations 26. Base station 26 connects to a number of transmitters 28, 30, to communicate with portable wireless music players 32 and 34. Because the player is portable, it is preferred that a suitable technique is utilized to resolve addressing issues. In one implementation, a dynamic host control configuration protocol server is implemented at base station 26 to dynamically assign Internet protocol addresses to portable wireless players when the player is turned on and logs onto the network. Of course, in the alternative, other addressing techniques may be utilized. In addition, it is preferred that the link between a portable device and the base station of the wireless service network 24 includes a quality of service rating. By utilizing a lower quality of service rating for the portable players than for other wireless devices, the network may be utilized for other devices with higher quality of service ratings such as cellular phones or personal digital assistance. A suitable wireless service network is a packet network such as a virtual local area network. The last leg of the network is preferably implemented as an Internet protocol network to allow the use of dynamic host configuration protocol (DHCP) for the server to resolve addressing issues. By utilizing quality of service ratings, the portable wireless devices may be implemented in such a way as to not interfere with other devices on the network. In particular, from time to time, the portable device downloads information in a burst, and for most of the time, the device is idle.

To complement the use of DHCP, a preferred embodiment of the present invention utilizes a wireless service network configured as a virtual local area network (VLAN). In turn, a portion of the network bandwidth would be allocated as a wireless local area network. Thin client wireless devices (the players) would connect to the local area network via a suitable protocol such as DHCP and VLAN. For the last leg of the network, transmission control protocol/Internet protocol (TCP/IP) over code division multiple access (CDMA) would be appropriate. Of course, other multiplexing techniques, such as time division multiplexing could also be appropriate. The network, preferably, is a true TCP/IP network with the last leg being mobile and wireless. The base station controller functionality to this network is a portable access device for CDMA and IP packets. In the alternative, the TCP/IP stack may be located away frm the remote client, with a portion of the last leg utilizing a proprietary protocol.

In FIG. 2, an exemplary portable wireless player for use in playing programming received over a wireless link to a wireless service network is generally indicated at 40. The player plays information, such as music, that is predefined as a play list at the service provider through user interaction at a remote client such as a computer connected to the Internet. The portable wireless player includes a housing 42, and a processor and memory disposed in the housing. An appropriate transmitter and receiver for transmitting and receiving information over the wireless service network are also included within housing 42. As shown in FIG. 2, the exemplary implementation of the device includes a suitable display 44 that shows the play list along with indicators 46 and 48 that indicate that more information is available than that shown in display 44 at the present time. Scroll buttons 50 and 52 may be used to scroll through the play list. Information is transmitted and received with antenna 54. In the exemplary implementation, an on/off button 60 allows the user to turn the portable device on and off. In addition, play button 62 and stop button 64 are used to control the player. Scroll buttons 50 and 52 may serve as next track/previous track buttons to allow scrolling through different selections within the play list. As appreciated, the device may be equipped with a speaker, or in the alternative, a line out jack 66 allows the connection of headphone 70 to the device. Further, in the alternative, a suitable adaptor such as a cassette deck adaptor may be connected to line out jack 66 to allow the device to be utilized within a vehicle. In addition, the device may be powered by batteries, and may optionally include direct current adaptor jack 68 and transformer 72 so that the device may be plugged into a standard alternating current wall socket.

In FIG. 3, a general implementation of the portable wireless player is generally indicated at 80. The player 80 includes processor 82, memory 84, speaker or line out 86, control buttons 88, transmitter 90, receiver 92, power source 94 (batteries, or direct current adaptor jack), and display 96. Memory 84 includes instruction that direct the processor to connect to the service provider over the wireless service network, to download programs into the player in accordance with the previously defined play list which is downloaded at log-on, and to play the programming.

From a business standpoint, in a wireless data network, embodiments of the present invention allow many customers to each pay a small monthly fee for limited service (the ability to predefine a play list and then receive that information over a wireless link). This is advantageous over existing personal digital assistants that have a higher fee for a few customers that want numerous services. Further, the play list, in addition to including music tracks may include online radio and news stations and optionally could include paging/messaging capabilities. Commissions could be derived from online radio stations, music vendors, and voice books.

It is appreciated that preferred implementations of the present invention utilize the portable player for playing music files received over the wireless service network. The device may play one file, while simultaneously receiving other files over the wireless link. To keep the cost of the individual player down, limited memory may be used, and the player may have only enough memory to store a few songs. The amount of memory would determine the cost. The cheapest device would only have enough memory to hold a few seconds of sound. The player may then, after playing a song, clear that portion of memory for a new song to be downloaded. That is, embodiments of the present invention may be implemented in a very cost effective manner because the amount of memory needed is much less than existing MP3 players that utilize lots of memory but do not have wireless link capabilities for downloading over a wireless service network. The existing devices must be connected to a computer and all music to be later played must be downloaded to the device. The claimed invention allows the user to predefine the play list at the music service provider from a remote terminal such as a computer connected to the Internet, and subsequently, the player downloads and plays the music tracks (or radio stations or other online information).

It is appreciated that embodiments of the present invention have various different implementations. For example, the files can be played or not played as they are downloaded. The screen could display the files that are in memory and the amount of play time for each file. A song may be replayed if desired. The buffersize of memory may depend on how much programming can be replayed on-demand. The amount of memory would determine the cost of the device. The cheapest device would only have enough memory to hold a few seconds of sound. Not only the price but also the cost of use should be a consideration. The memory and processor consume battery life as experienced in the cell phone industry. To lower the cost, ferroelectric nonvolatile random access memory and ferroelectric nonvolatile logic could be used. Or any other combination of memory devices could be used to keep the cost of use down and maximize the length of play. Different models could be made based on the customer preferences. Disk drives and simcards, as they become minuturized, cheap, and have low power consumption, could also become an alternative to memory.

For example, the play list may include 50 or even 100 items, but the device will only have sufficient memory to store two or three tracks at a time. The low quality of service rating for the device relative to other devices used in the wireless service network allows the portable players to be implemented without significantly negatively impacting the performance of existing devices in the wireless network. As shown in FIG. 4, a method in a preferred embodiment of the present invention for a music player is generally indicated at 100. At block 102, the user connects with the music service provider from a remote client. At block 104, the user defines the play list. At block 106, the user connects with the player over the wireless service network using DHCP and quality of service (QOS). Of course, other addressing schemes may be utilized in the alternative to DHCP and the TCP/IP stack may be at the device or away from the device as mentioned previously. At block 108, music is downloaded through the player when the music is on the previously defined play list. Of course, the device is not limited to music. At block 110, the device plays the programming, which may be music, or an online radio station, or other online information.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A method of providing programming to a portable wireless music player having a memory and being operative to transmit and receive information over a wireless link to a wireless service network, the portable wireless music player being only a relatively simple listening device with limited functionality so as not to be time critical in its operations, the wireless service network being in communication with a music service provider wherein the music service provider allows connections from remote clients, the method comprising:

receiving a connection to the music service provider from a remote client;

receiving a definition of a play list at the music service provider through user interaction at the remote client, wherein the play list includes two or more songs;

receiving a connection to the music service provider from the portable wireless music player over the wireless service network, wherein the portable wireless music player logs onto the music service provider and wherein the portable wireless music player is different from the remote client;

receiving a selection of a song at the music service provider from the portable wireless music player according to the play list, wherein receiving the selection of the song indicates that the portable wireless music player is in a non-idle state such that the portable wireless music player is operable to download the song; and in response to receiving the selection of the song at the music service provider, the music service provider automatically downloading the selected song in a burst to the portable wireless music player, such that the portable wireless music player returns to an idle state substantially after receiving the selected song in the burst.

2. The method of claim 1 wherein the music service provider is connected to the Internet, and wherein connecting to the music service provider from the remote client further comprises connecting over the Internet.

3. The method of claim 1 wherein the wireless service network includes a last leg, and wherein the last leg is in accordance with Internet protocol.

4. The method of claim 3 wherein the last leg is in accordance with dynamic host configuration protocol.

5. The method of claim 4 wherein the connection between the music service provider and the portable wireless music player, including a portion of the connection over the last leg, includes a quality of service rating.

6. The method of claim 5 wherein the wireless service network is for providing a plurality of services in addition to connections to the music service provider, and wherein the plurality of services have different quality of service ratings.

7. The method of claim 1, wherein:

the connection between the music service provider and the portable wireless music player includes a quality of service rating; and receiving the selection of the song indicating that the portable wireless music player is operable to download the song further indicates that the quality of service rating is at a level conducive to downloading the song to the portable wireless music player as the burst.

8. The method of claim 1, further comprising:

in response to the log-on to the music service provider, the music service provider downloading the predefined play list to the portable wireless music player, wherein receiving a selection of a song at the music service provider from the portable wireless music player according to the play list comprises receiving a selection of a song at the music service provider in response to the portable wireless music player receiving a selection of a song from the play list.

9. The method of claim 1, further comprising:

while the portable wireless music player is playing the selected song, the music service provider automatically downloading at least a second song to the portable wireless music player, wherein the second song is also part of the play list.

10. The method of claim 1, wherein:

the portable wireless music player operates over an operating duration; and the portable wireless music player operates in the idle state during the majority of the operating duration.

11. A method of providing programming to a portable wireless player having a memory and being operative to transmit and receive information over a wireless link to a wireless service network, the portable wireless player being only a relatively simple listening device with limited functionality so as not to be time critical in its operations, the wireless service network being in communication with a service provider wherein the service provider allows connections from remote clients, the method comprising:

connecting to the service provider with the portable wireless player over the wireless service network, the connection between the service provider and the portable wireless player including a quality of service rating;

the portable wireless player, in response to a favorable quality of service rating between the portable wireless player and the service provider, automatically downloading a first part of a play list in a burst, the play list being predefined at the service provider through user interaction at a remote client and including one or more multimedia files;

after downloading the first portion of the play list, the portable wireless player remaining idle for a period of time; and after the period of time and in response to another favorable quality of service rating between the portable wireless player and the service provider, the portable wireless player automatically downloading a second portion of the play list in a burst from the service provider, the second portion including one or more multimedia files.

12. The method of claim 11 further comprising:

connecting to the service provider from the remote client; and defining the play list at the service provider through user interaction at the remote client.

13. The method of claim 11, wherein:

the wireless service network provides a plurality of services in addition to connections to the service provider, and wherein the plurality of services have different quality of service ratings; and a favorable quality of service rating is defined as a function of at least two of the plurality of quality of service ratings.

14. The method of claim 11, further comprising:
receiving the playlist at the portable wireless player in response to the favorable quality of service rating and prior to automatically downloading the first part of the play list in a burst.

15. The method of claim 11, further comprising:
playing the first portion of the play list at the portable wireless player; and
after playing the first portion of the play list, the portable wireless player erasing at least some of the first portion of the play list to make memory in the portable wireless player available for additional content to be downloaded.

16. A portable wireless player for use in playing programming received over a wireless link to a wireless service network, the wireless service network being in communication with a service provider that allows connections from remote clients wherein a remote client connects to the service provider and defines a play list at the service provider through user interaction at the remote client, the portable wireless player comprising:
a housing;
a processor disposed in the housing;
a memory disposed in the housing and in communication with the processor;
a transmitter in communication with the processor configured to transmit information over the wireless service network;
a receiver in communication with the processor configured to receive information over the wireless service network; and
instructions in the memory that direct the processor to automatically and periodically establish a connection to the service provider over the wireless service network, wherein the portable wireless player, upon connection to the service provider, downloads information in a burst in accordance only with the previously defined play list, the connection between the portable wireless player and the service provider remaining idle between downloads, such that:

the portable wireless player establishes the connection with the service provider and downloads a first portion of the play list in a first burst;
the portable wireless player begins playing the first portion of the play list during an idle duration after the first burst is complete; and
the portable wireless player establishes the connection with the service provider after the idle duration and downloads a second portion of the play list as a second burst.

17. The player of claim 16 wherein the wireless service network includes a last leg in accordance with Internet protocol, and wherein the instructions further comprise: instructions in the memory for connecting to the wireless service network in accordance with Internet protocol.

18. The player of claim 17 wherein the instructions further comprise: instructions in the memory for connecting to the wireless service network in accordance with dynamic host configuration protocol.

19. The player of claim 18 wherein the connection between the music service provider and the player, including a portion of the connection over the last leg, includes a quality of service rating.

20. The player of claim 19 wherein the wireless service network is for providing a plurality of services in addition to connections to the music service provider, and wherein the plurality of services have different quality of service ratings.

21. The player of claim 16, wherein the memory only stores two portions of the play list at one time.

22. The player of claim 16, wherein the instructions in the memory further direct the processor such that:
the portable wireless player erases the first portion of the play list after playing the first portion to make available a portion of the memory; and
the portable wireless player downloads a third portion of the play list into the portion of the memory made available by erasing the first portion.

* * * * *